March 26, 1940.  M. ROMAINE ET AL  2,194,568
BROACHING MACHINE
Filed May 14, 1937  7 Sheets-Sheet 1
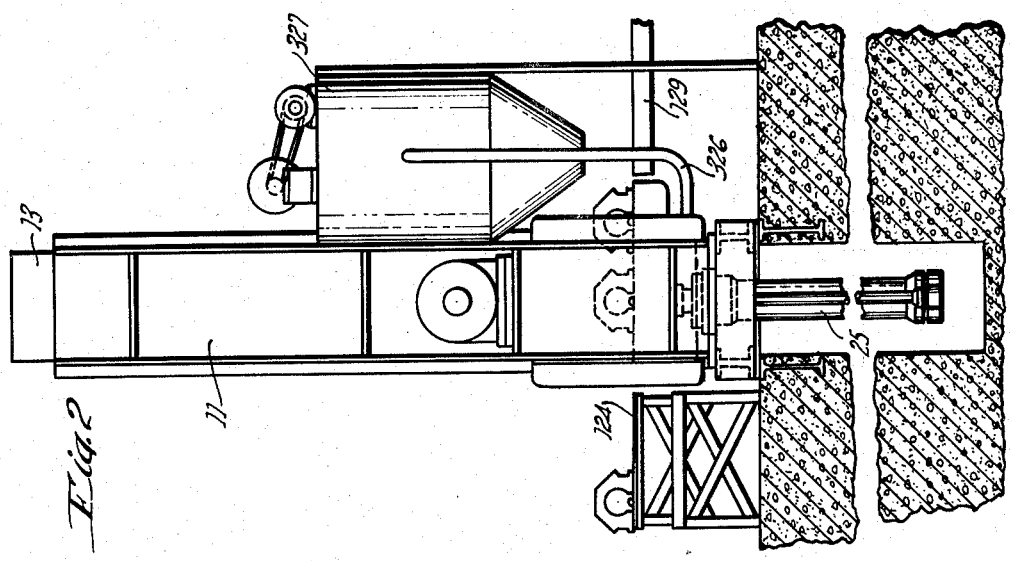
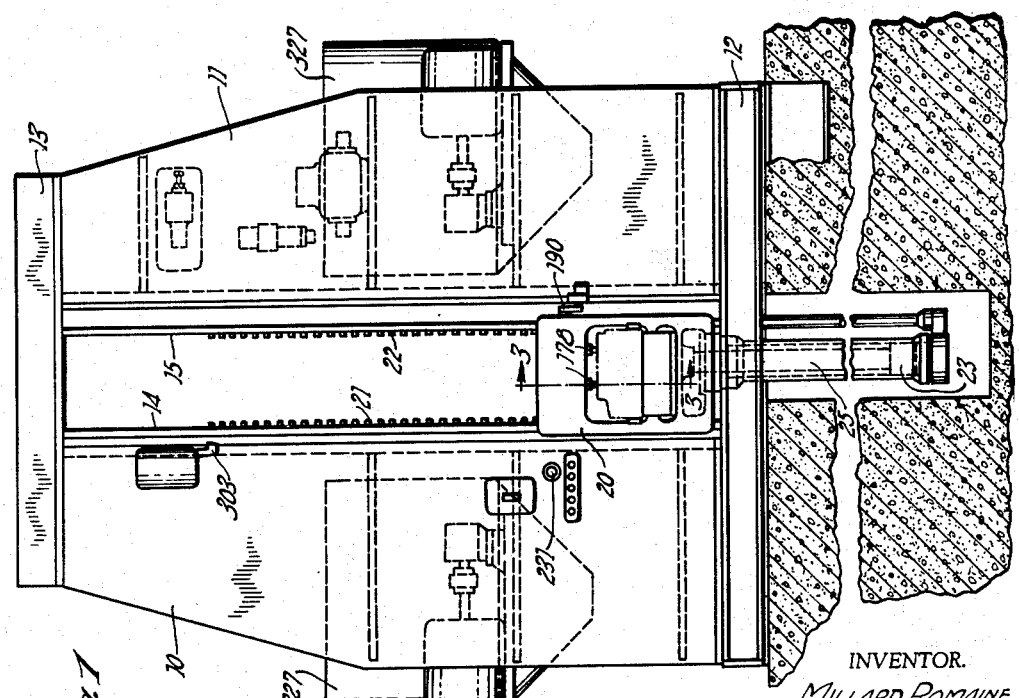
INVENTOR.
MILLARD ROMAINE
WINTHROP TRIBLE
BY
AHK Parsons
ATTORNEY.

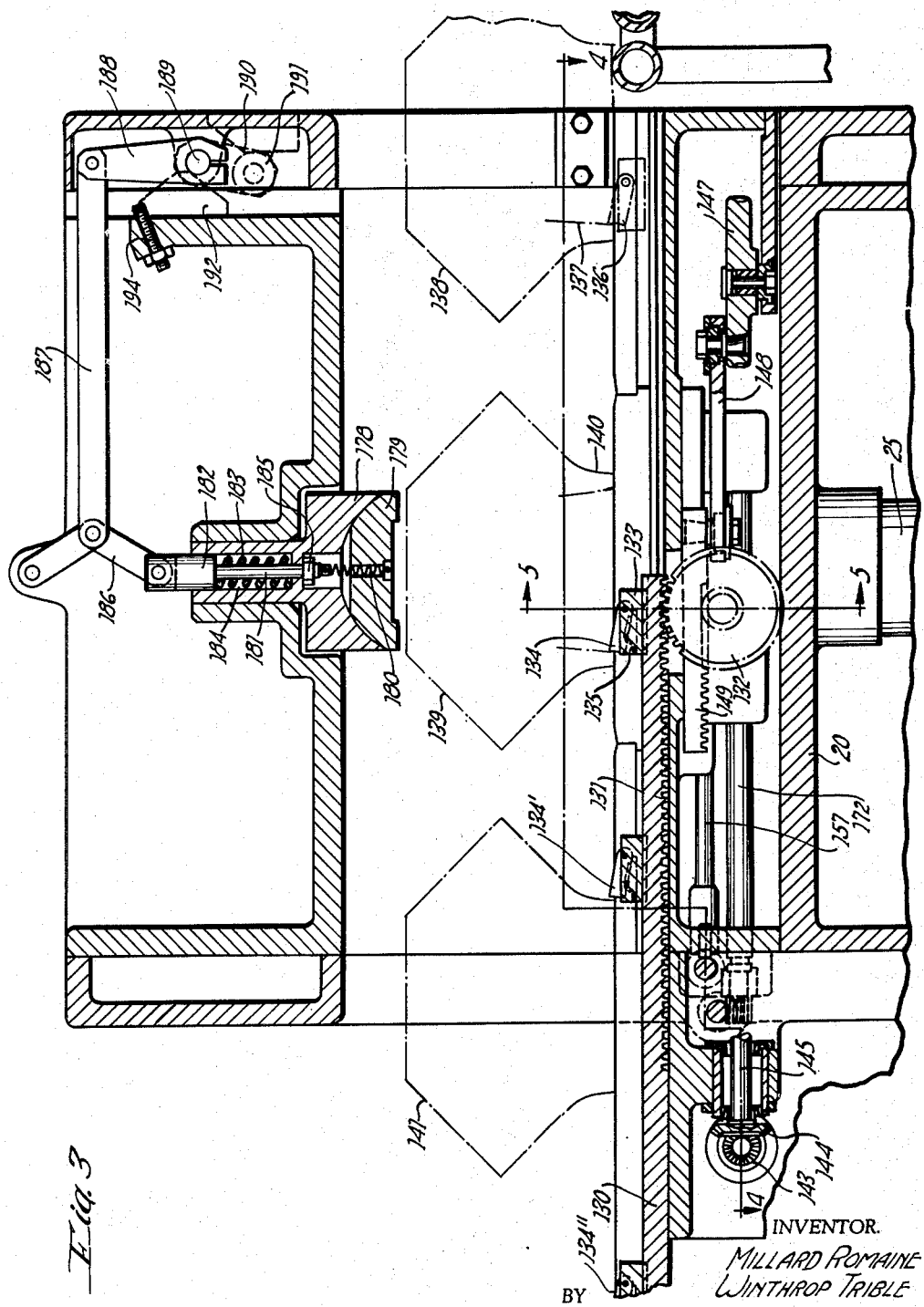

March 26, 1940.　　M. ROMAINE ET AL　　2,194,568
BROACHING MACHINE
Filed May 14, 1937　　7 Sheets-Sheet 3

INVENTOR.
MILLARD ROMAINE
WINTHROP TRIBLE
BY
A. H. K. Parsons
ATTORNEY.

March 26, 1940.  M. ROMAINE ET AL  2,194,568
BROACHING MACHINE
Filed May 14, 1937    7 Sheets-Sheet 4

INVENTOR.
MILLARD ROMAINE
WINTHROP TRIBLE
BY
AHK Parsons
ATTORNEY.

March 26, 1940.  M. ROMAINE ET AL  2,194,568
BROACHING MACHINE
Filed May 14, 1937   7 Sheets-Sheet 5

INVENTOR.
MILLARD ROMAINE
WINTHROP TRIBLE
BY
AHK Parsons
ATTORNEY.

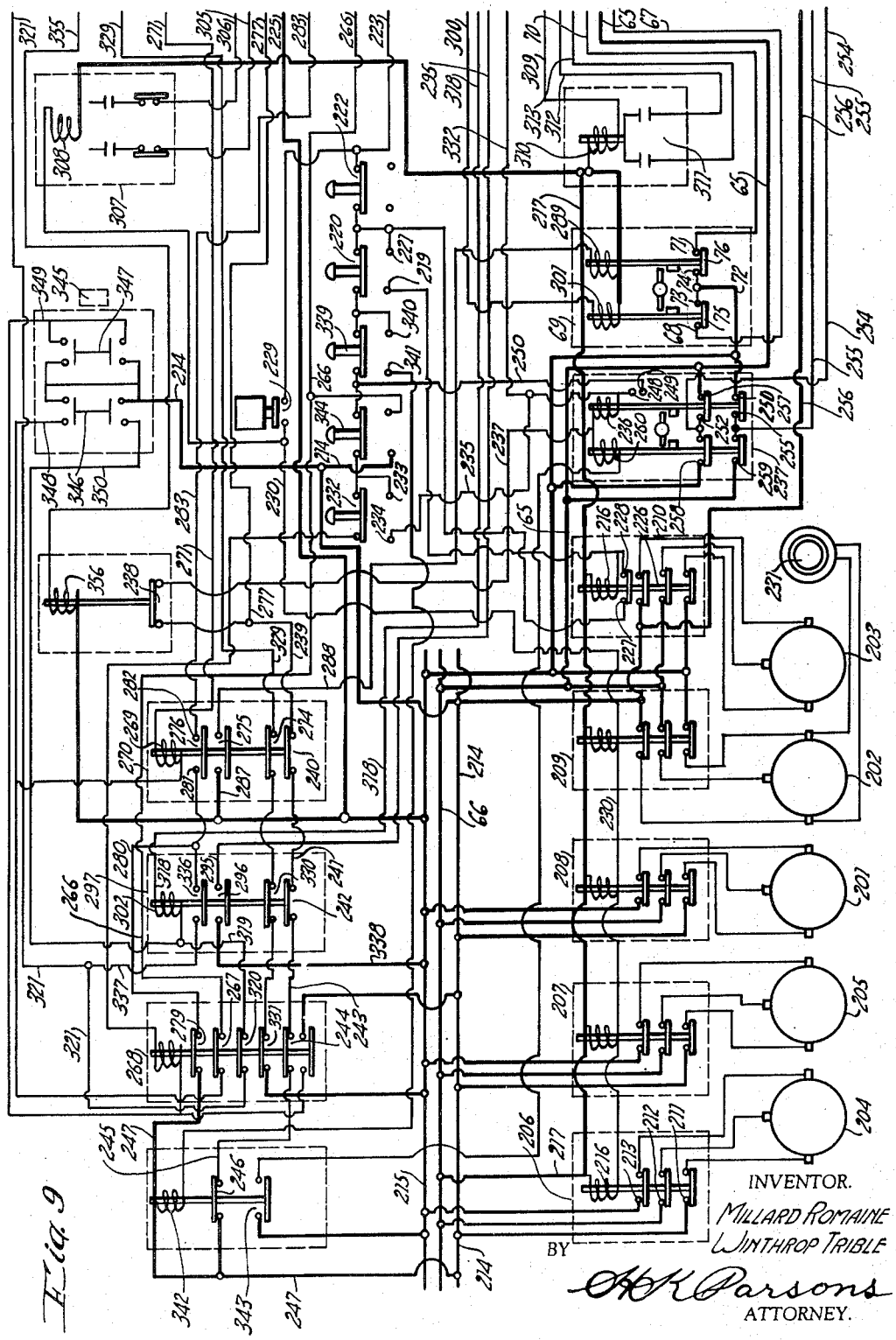

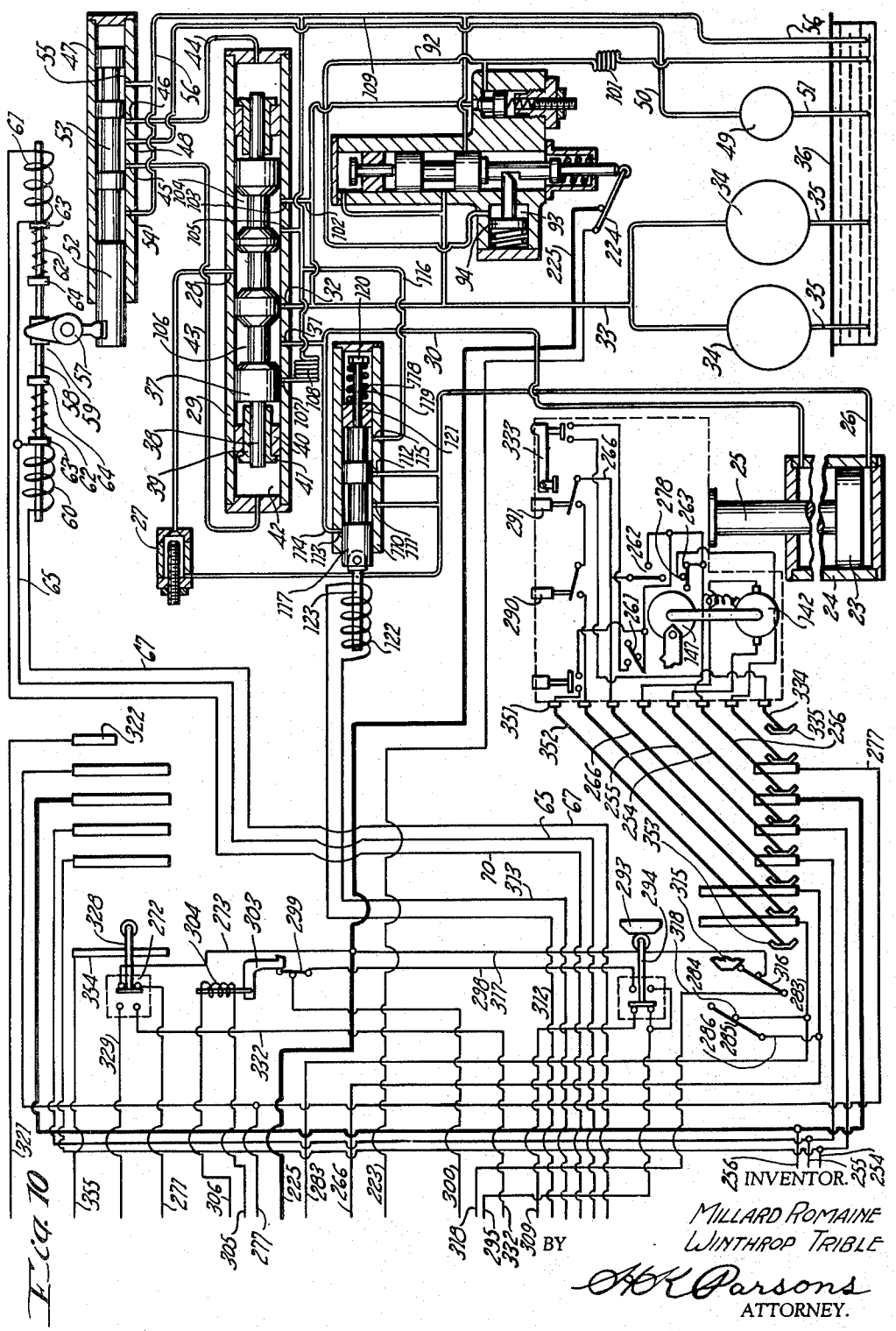

Patented Mar. 26, 1940

2,194,568

UNITED STATES PATENT OFFICE 2,194,568

BROACHING MACHINE

Millard Romaine and Winthrop Trible, Cincinnati, Ohio, assignors to The Cincinnati Milling Machine Co., Cincinnati, Ohio, a corporation of Ohio Application May 14, 1937, Serial No. 142,676

24 Claims. (Cl. 90—33)

This invention relates to broaching machines and more particularly to an improved form of vertical broach, especially adapted for broaching large work pieces to precision length.

One of the objects of this invention is to provide a broaching machine which is especially suitable for broaching large heavy work pieces and in such a manner that the operator does not have to handle the work.

Another object of this invention is to provide a machine of the character described in which the work is automatically loaded, machined and ejected from the machine without attention on the part of the operator.

Another object of this invention is to provide a hydraulically operated broaching machine having electrically operated work transferring mechanism with suitable interlocks between the two operating mechanisms so that the machine may be safely operated by unskilled labor.

Another object of this invention is to provide a machine for broaching cylinder blocks which is adapted to receive the blocks in the ordinary position in which they are moved on the conveyor so that the operator does not have to lift or turn the work in order to load the machine, and which has power operated means for ejecting the finished work pieces from the machine onto a second conveyor without any attention on the part of the operator.

An additional object of this invention is to provide a broaching machine for simultaneously broaching opposite ends of a work piece and which is vertically arranged so that a minimum amount of floor space is utilized for supporting the machine.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a front elevation of a machine tool embodying principles of this invention.

Figure 2 is a side view of the machine shown in Figure 1 as viewed from the right side of that figure.

Figure 3 is a vertical section through the work holder of the machine as viewed on the line 3—3 of Figure 1.

Figure 9 is a diagrammatic view of the electrical control circuit of the machine.

Figure 10 is a diagrammatic view of the hydraulic control circuit of the machine showing the control connections therefrom to the electrical control circuit shown in Figure 9.

Figure 4:
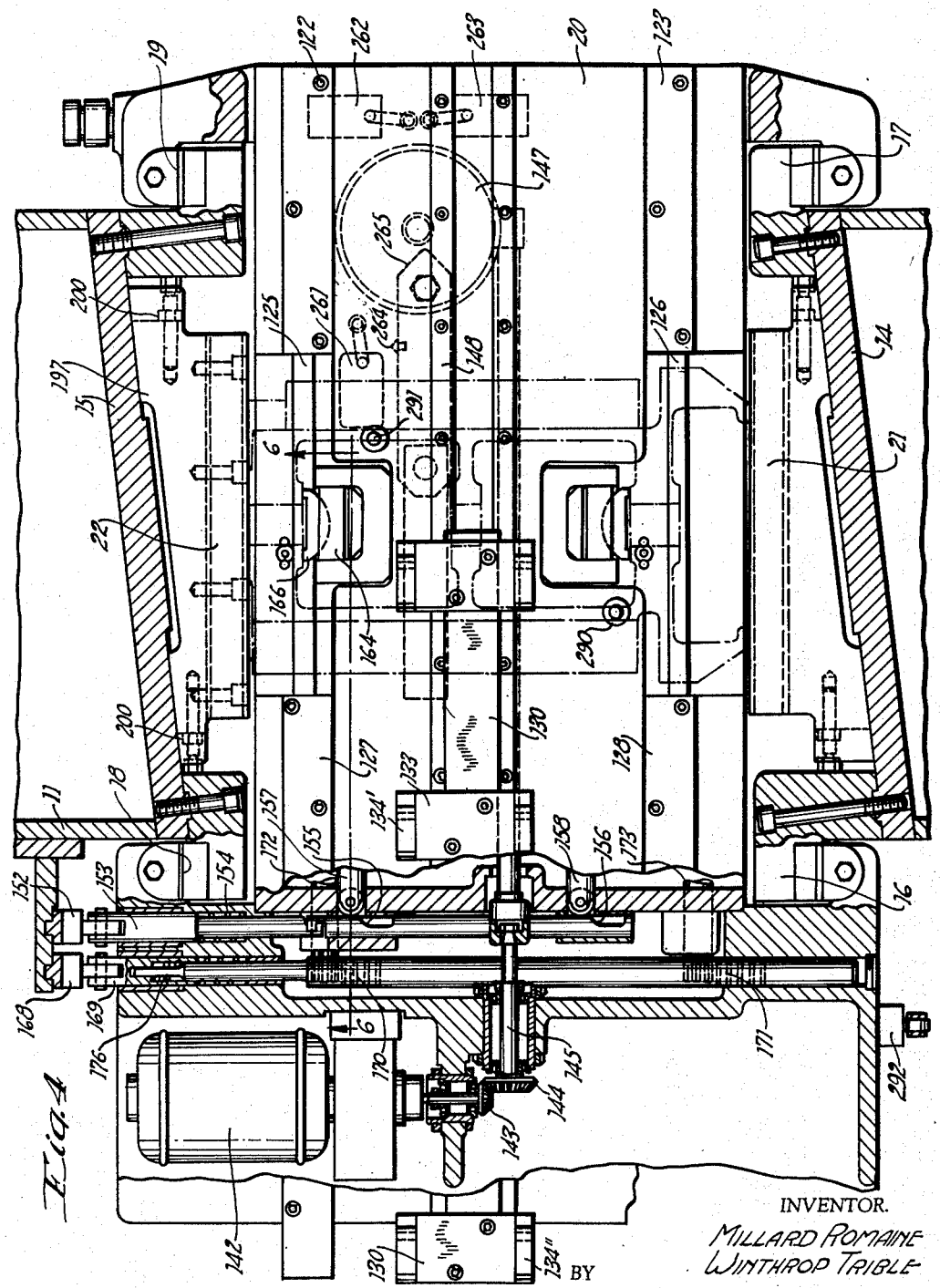
Figure 4 is a plan view in section as viewed on the line 4—4 of Figure 3.

Referring to Figures 1 and 2 of the drawings the reference numerals 10 and 11 indicate two vertical columns which are supported on a base member 12 and connected together at the top by a cap member 13. The opposing faces 14 and 15 of the columns 10 and 11 respectively are provided with guide surfaces 16, 17, 18 and 19, as more particularly shown in Figure 4. A work carrying elevator 20 is guided by these surfaces for vertical movement past a series of broaching tools 21 and 22 supported on the opposing faces of the columns 10 and 11 respectively.

As shown in Figure 1 this elevator is actuated by a piston 23 contained in a cylinder 24 and connected to the elevator by a piston rod 25. Referring to Figure 10, one end of the cylinder 24 is connected by a channel 26 through a throttle valve 27 to port 28 of the reversing valve 29. The other end of the cylinder is connected by channel 30 to port 31 of the reversing valve. The valve 29 has a pressure port 32 which is connected by channel means 33 to a pair of pumps 34. These pumps have intakes 35 through which fluid is withdrawn from a reservoir 36. The valve plunger 37 has three positions, that is, a central or stop position which is the one in which it is shown in Figure 10; a feed position when it is shifted to the left which causes upward movement of the work elevator; and a rapid traverse position when it is shifted to the right of the position shown in which it will cause downward movement of the work elevator.

The opposite ends of this plunger are provided with reduced portions 38 which slide in bores formed in piston members 39, which, in turn, are slidable in bores formed in fixed blocks 40 formed in the valve housing. The members 39 are provided with shoulders 41 to limit their inward movement.

The valve plunger is shifted by hydraulic pressure which is admitted to space 42 formed on opposite ends of valve housing and when pressure is admitted to both of these spaces the piston members 39 move toward one another to the limit of their movement as defined by the shoulders 41 whereby the valve plunger 37 is positioned in its central or neutral position whereby it closes the pressure port 32. When one of the spaces 42 is supplied with pressure and the other connected to reservoir, the hydraulic pressure acting on the end of the reduced portion 38 will cause the plunger to move a further amount, carrying with it the other opposing piston member 39, which is now possible because no hydraulic pressure is acting upon it.

The spaces 42 are connected by channels 43 and 44 to ports 45 and 46 respectively of a pilot valve 47. This pilot valve 47 has a pressure port 48 which is supplied from a separate pump 49 through delivery channel 50. This pump has an intake 51 through which fluid is withdrawn from reservoir 36. The valve plunger 52 of the pilot valve has a central annular groove 53 which is of sufficient length that when the plunger 52 is in its central position, it will interconnect the pressure port 48 with both of ports 45 and 46 which will thereby cause delivery of fluid pressure to both of the spaces 42 and thereby centralize the control valve plunger 37. The pilot valve also has a pair of exhaust ports 54 and 55 which are connected by channel 56 to reservoir. When the plunger 52 is shifted to the left, the annular groove 53 will connect pressure port 48 to port 45 and simultaneously interconnect pressure port 46 to the exhaust port 55 whereby the plunger 37 will be shifted to the right, as viewed in Figure 10 and when the pilot valve is shifted to the right, pressure port 48 will be connected to pressure port 46 and port 45 will be connected to the exhaust port 54 whereby the control plunger 37 will be shifted to the left.

The pilot valve plunger 52 is operatively connected as by a pivoted lever 57 to a shifter rod 58. The shifter rod has a pair of fixed abutments 59 engaging opposite sides of the lever whereby movement of the shifter rod in one direction or the other will cause shifting of the pilot valve 52 in one direction or the other from its central position. The opposite ends of the shifter rod are slidably mounted in electrical solenoids 60 and 61 and constitute armatures, whereby energization of either solenoid will cause shifting of the pilot valve plunger in one direction or the other. When both solenoids are deenergized, springs 62 arranged between fixed abutments 63 on the solenoids and collars 64 carried by the shifter rod 58 cause the shifter 58 to return to a central position, and thereby centralize the pilot valve. In other words, these springs constitute resilient means for shifting the pilot valve to a stop position, automatically, when both solenoids are deenergized. One end of each of these solenoids is connected by a common electrical line 65 to one of the power mains 66 of a three-phase system.

The other end of solenoid 60 is connected by line 67 to contact 68 of the pilot valve control switch 69. The other end of solenoid 61 is connected by line 70 to contact 71 of switch 69. This last-named switch is provided with power line 72 which is directly connected to another power main 215 of the three-phase system. The line 72 terminates in contacts 73 and 74 whereby when the contact 73 is connected to the contact 68 by the switch member 75, the solenoid 60 will be energized and when the contact 74 is connected to the contact 71 by the switch member 76 then the solenoid 61 is energized.

Figure 7:
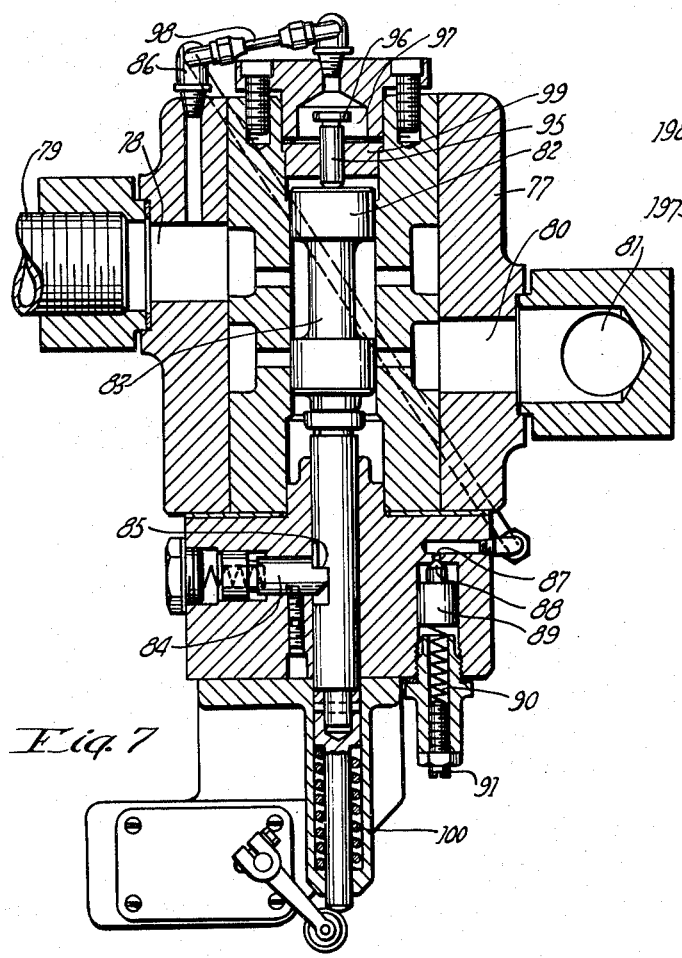
Figure 7 is a cross sectional view through the automatic reclosing relief valve of the hydraulic circuit.

To prevent excessive pressures in the hydraulic system an automatic resetting relief valve 77 has been provided, which is shown in detail in Figure 7. This valve has a pressure port 78 which is connected by branch line 79 to the pump supply line 33. It also has an exhaust port 80 which is connected by channel 81 to reservoir. The valve is provided with a main plunger 82 which has an annular groove of sufficient length that when moved down from the position in which it is shown in Figure 7 it will interconnect port 78 with port 80 without appreciable throttling of the flow. This plunger is held in the position shown by a positive locking member 84 which engages a notch 85 cut in the side of the plunger.

The pressure port 78 is connected by a branch line 86 to port 87. This port is normally closed by the conical shaped end 88 of a plunger 89 which is normally urged into the position shown by a spring 90. The tension of this spring may be adjusted by set screw 91 which engages the end of the spring 90. It is the tension of this spring which determines the pressure point at which this valve will open. In other words, when this is opened, the pressure from line 86 is admitted to channel 92 which, as shown in Figure 10, is connected to cylinder 93 which contains the piston 94 integrally connected to the end of the locking member 84 causing withdrawal thereof. The upper end of plunger 82 engages the end of a fluid actuated pin 95 which has an enlarged head 96 movable in chamber 97. This chamber is connected by channel 98 to the pressure port 78 so that upon withdrawal of the locking pin 84 the plunger 82 will be moved downward until the head 96 abuts the wall 99. This downward movement will compress spring 100 which surrounds the reduced end of the plunger, which will act to return the plunger to its normal position upon reduction of pressure in the supply line below the predetermined limit. When this happens the port 87 will be closed and the fluid in channel 92 will drain to reservoir through the resistance 101. This will relieve the pressure in cylinder 93 and permit the locking pin 84 to return to a locking position.

When the main control valve 37 is in its stop position the pumps 34 are directly connected to pressure by means of a branch line 102 leading from the main supply line 33 to port 103, which is interconnected by annular groove 104 formed in the plunger 37 to exhaust port 105. When the plunger 37 is shifted to the left to a feed position, the port 32 is connected to the port 28, whereby the fluid pressure will flow through the throttle valve 27 to lower end of cylinder 24; and the upper end of the cylinder will be connected through port 31, annular groove 106 of plunger 37, and port 107 to reservoir. In order to prevent jumping and insure a uniform back pressure in the cylinder, a hydraulic resistance coil 108 is interposed between port 107 and the return line 109.

When the valve plunger 37 is shifted to the right, pressure port 32 is connected to port 31 and thereby to the upper end of cylinder 24; and the returning fluid will pass through the throttle valve 27 which thereby prevents the downward movement from becoming too fast which might cause damage to the parts. In spite of this, the downward movement is at a fast rate and it is necessary to provide additional means which produce a dashpot effect to quickly slow down the ram movement and bring the same to a stop. This means comprises a decelerator valve 110 which has a pair of ports 111 and 112 which are connected by branch lines to channel 26. This valve also has a port 113 which is connected by branch line 114 to channel 30, leading from the upper end of cylinder 24. An additional port 115 formed in the valve is connected by line 116 to return line 109. The valve plunger 117 of this valve is normally held in the position shown by a spring 118 which surrounds the reduced end 119 of the plunger. The spring 118 is interposed between an abutment 120 formed on the end of the valve plunger and a wall 121 formed in the valve housing.

The valve plunger is shifted to the left by means of an electrical solenoid 122 which has an armature 123 connected to the end of the plunger 117. When this solenoid is energized, the plunger 117 is shifted to the left, thereby interconnecting port 111 with 113 and port 112 with port 115. The result is that the upper and lower end of cylinder 24 are interconnected and both ends are simultaneously connected to reservoir. Since the lower end of piston 23 is larger in area than the upper side thereof, it will be apparent that a resultant component acting in a direction against the direction of movement will be provided to act as a decelerating means slowing down and stopping the movement of the ram.

*Work transfer mechanism*

As shown in Figures 3, 4, 5 and 6, the elevator 20 is provided with a first pair of fixed rails 122 and 123 upon which the work is received from the work supplying conveyor 124 positioned at one end of the machine, as more particularly shown in Figure 2. The work is moved by power along these guide rails and onto a second set of rails 125 and 126 which are vertically movable. These last-named rails serve to lower the work into the work receiving fixture where it is clamped for the broaching operation.

After the broaching operation, the rails 125 and 126 elevate the work out of the fixture for transfer onto a third set of rails 127 and 128 which are fixed with the elevator and have their top surfaces in the same plane as the top surfaces of the other rails. The work is moved along this last set of rails to the outgoing conveyor 129 which is located at the side of the machine opposite to the incoming conveyor 124.

It will thus be seen that the elevator is provided with a pair of guide rails extending the full length thereof and having an intermediate portion which is vertically movable for moving work into and out of a work clamping fixture.

Figure 5:
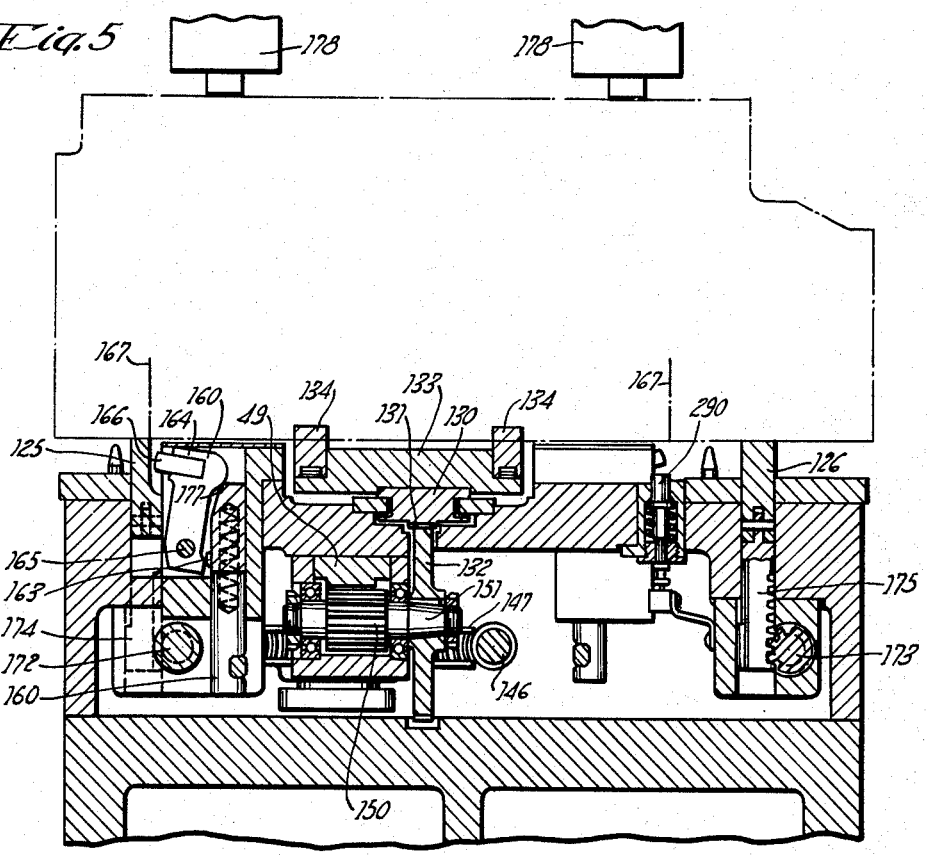
Figure 5 is a cross sectional view as taken on the line 5—5 of Figure 3.

The power operable means for moving the work along these guide rails consists of a reciprocable slide 130 which has rack teeth 131 formed on the underside thereof intermeshing with a gear 132. Three sets of work pushing means are attached to the upper side of the slide 130 and each set comprises, as shown in Figure 5, a cross block 133 having pivotally mounted at opposite ends a pair of work pushing fingers such as 134, 134' and 134". A leaf spring 135 is interposed between the underside of each finger and its supporting block 133 for normally urging the finger upward above the plane of the fixed rails for work engaging purposes.

This slide starts from the right and moves toward the left. When in its starting position, the finger 134 is in its dash and dot position, indicated by the reference numeral 136. While the parts are at rest in this position, a work piece is pushed onto the elevator by the operator until the fingers 134 in the position indicated by said dash and dot lines at 136 snap into engagement with a surface 137 of a work piece 138. During a cycle of operation, the fingers 136 move the work piece to the left onto the movable rails and then return to their starting position. During this return, the fingers 134' pass under the work and snap into position for engagement with the work surface 140 on the next cycle.

Upon the next reciprocation of the slide 130 the work is moved to the position indicated by the reference numeral 141 and during the last part of the cycle, the fingers 134" pass under the work and into position to engage the surface 140 of the work preparatory to moving it onto the outgoing conveyor 129.

The one-cycle mechanism for reciprocating the slide 130 comprises an electric motor 142 which is supported by the elevator, as shown in Figure 4, and has a bevel gear 143 secured to the end of its armature shaft in mesh with a double gear 144. This gear is secured to the end of a shaft 145 for driving a worm 146 which intermeshes with a worm wheel 147. The worm wheel 147 is rotatably mounted on the elevator, as shown in Figure 3, and connected by a link 148 for reciprocating a rack bar 149. The rack bar 149, as shown in Figure 5, intermeshes with a pinion 150 integral with a shaft 151 to which the gear 132 is secured. Since the link 148 is eccentrically connected to the worm wheel 147 it will be apparent that during one revolution of the worm wheel 147, the rack 149 will execute one reciprocation and thereby, through the interconnecting gearings 150 and 132 will cause one reciprocation of the slide 130.

Figure 6:
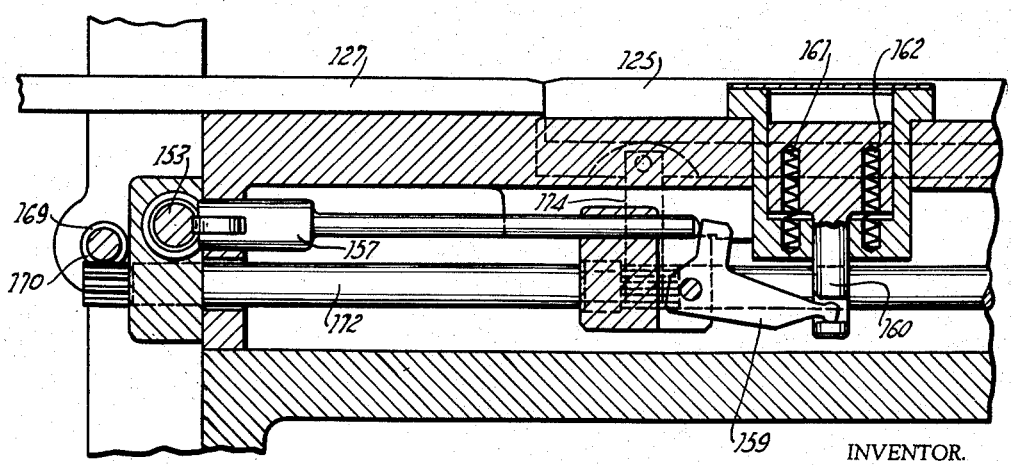
Figure 6 is a sectional view as taken on the line 6—6 of Figure 4.

After the work has been positioned on the movable rails 125 and 126, resiliently operable means are provided for lowering the work into the fixture and then clamping the same; and positively operated means for unclamping the work and raising the same out of the fixture. The operation of the mechanism will be better understood if the last-named means is described first. In other words, as the elevator returns downward to the position in which it is shown in the drawings, a control dog 152 which is fixed on the side of the column 11 and in the path of the end of a plunger 153 shifts the plunger 153 against the compression of spring 154 and thereby, through means of cams 155 and 156 formed on the plunger axially shifts a pair of right angularly arranged plungers 157 and 158. As shown in Figure 6, the plunger 157 rotates a bell crank 159 and thereby draws downward a clamp actuating member 160 against the compression of springs 161 and 162.

As shown in Figure 5, the member 160 has a lug 163 projecting from the side thereof which engages the lower end of a pivoted clamping member 164. This member is pivoted on a pin 165 and has a clamping finger 166 adapted to engage an inside surface 167 formed on the work. The plunger 158 operates a similar mechanism to withdraw a similar clamping member out of engagement with the work.

After the two clamping members have been withdrawn, a second dog 168, also carried by the column, and positioned in the path of the end of a plunger 169, shifts the same inward and thereby, through circular rack teeth 170 and 171 formed thereon, causes rotation of a pair of shafts 172 and 173. These shafts, as shown in Figure 5, have gear teeth cut in the periphery thereof for interengagement with rack plungers 174 and 175. These rack plungers are connected to the rails 125 and 126 respectively. There are two of these rack plungers for each rail so that the same will be moved upward and downward without tilting. As the elevator moves upward on its cutting stroke, the plunger 169, which was the last to be operated on the downward stroke, will clear its dog 168 first and a spring 176 will cause outward movement of the plunger and thereby reverse the rotation of shafts 172 and 173, which will thereby lower the rails 125 and 126 and move the work down into the fixture. As soon as this is accomplished, the plunger 153 will have passed out of engagement with its operating dog 152 and the spring 154 will shift the plunger in such a direction as to withdraw the cam surfaces 155 and 156 out of engagement with plungers 157 and 158. This will permit the springs 161 and 162, shown in Figure 6, to elevate the clamp actuating members 160 whereby a cam surface 177 formed on the ends of these members will rotate the clamping members 164 in a counterclockwise direction and into engagement with the surface 167 formed on the work.

Additional means have been provided for automatically clamping the work, consisting of a pair of clamping plungers 178 which are shown in detail in Figures 3 and 5. Each plunger has a pivoted shoe 179 located in the bottom thereof for engaging the top surface of the work and automatically aligning itself therewith. This shoe is held in position by a spring 180 which is connected to the lower end of an actuating rod 181 which passes through the center of the plunger. This rod has an enlarged head 182 forming a shoulder which engages one end of a spring 183 contained in the bore 184. A nut 185 threaded on the end of the rod 182 serves to put a certain amount of compression on the spring 183, so that the plunger is normally constrained to move with the rod 181. Upon contact with the work, however, the head 181 may move down relative to the plunger 178 so as to apply a clamping pressure and at the same time provide a sort of yielding connection between the parts so that movement of the rod 181 may be the same, regardless of slight variations in the thickness of the work.

The rod 181 is connected by a toggle joint 186 and link 187 to an operating arm 188. This arm is pivoted at 189 in the elevator and has a second arm 190 connected therewith and which carries a roller 191 on the end thereof. During upward movement of the elevator the roller passes between a pair of cam members 191 and 192 which are attached to the column 11 and form a cam track 193 which rotates the lever arm 188 in a counterclockwise direction so as to actuate the toggle and move the clamping plunger 178 downward. A set screw 194 is positioned to engage the arm 188, but right after the toggle has passed through the center position.

When the elevator reaches the top of its stroke another cam plate 195 is positioned on a column for rotating the lever 188 in a clockwise direction to thereby release the top clamps.

Figure 12:
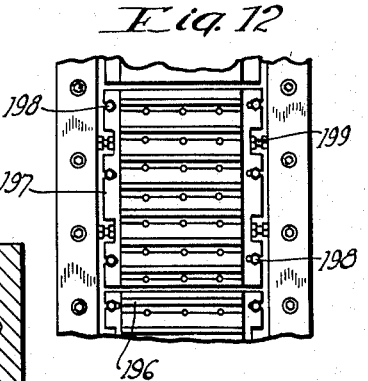
Figure 12 is a detail view showing the manner of mounting the broaching tools.
Figure 11:
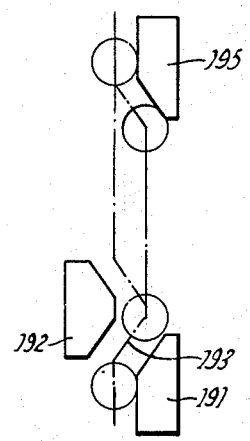
Figure 11 is a diagrammatic view showing the position of fixed dogs for operating one of the limit switches.

The manner of securing and adjusting the broaching tools on the two columns is more particularly shown in Figures 4 and 12. The individual blades 196 are suitably secured in a series of blocks or units 197, each unit holding a plurality of blades. These blocks are then fastened to the side of the column as by clamping screws 198 which pass through elongated slots formed in the blocks. These blocks, as shown in Figure 4, have angularly arranged rear faces so that by adjusting the block laterally, the teeth may be moved toward and from the work piece to vary the depth of cut. This adjustment is effected by a series of adjusting screws 199 which are threaded into the side of the blocks and the heads of these screws engage the solid part of the column. It will now be apparent that by loosening the clamping nuts 200 which are threaded on these screws and by rotating the screws in one side of the block in one direction and those in the other side of the block in the other direction, the block will be forced laterally in one direction or the other, and thereby due to the angular surfaces the broaching tools themselves will be forced toward or from the work. The clamping bolts 198 may be tightened then to secure the blocks firmly against the column. As a matter of fact, a gage is provided in the toolroom which simulates the condition in the machine whereby the adjusting screws 199 are preset in the required positions so that upon assembly the heads will touch on opposite sides without lost motion and thereby automatically position the block so that the assembler only has to tighten the clamping bolts.

*Electrical control circuit*

Although the elevator is hydraulically actuated, an electrical control circuit has been provided for governing the cycle of operation of the machine. A diagram of this electrical control circuit is shown in Figures 9 and 10, and by placing these figures in end to end relation, it will be apparent that the lines which break at the end of Figure 9 may be picked up again on Figure 10.

Separate electric motors have been provided for driving the pumps 34 and 49 and these are indicated in Figure 9 by the reference numerals 201, 202 and 203 respectively. In addition, two more motors 204 and 205 are connected into the electrical circuit and utilized for driving the fans in the two chip removing systems. The motors 204, 205, 201, 202 and 203 each have three wires which terminate in three contacts in the respective switches 206, 207, 208, 209, and 210. Each switch has three contacts—211, 212 and 213, which are connected respectively to the power lines 214, 66 and 215 respectively. Each of these switches also has an operating solenoid 216 which has one terminal connected to line 217 which is a branch of the power main 66. The operating solenoid of switch 210 is connected by line 218 to contact 219 of a manually operable switch 220. The other contact 221 of this switch is connected through the stop switch 222, which is normally closed, to line 223. This line, it will be noted from Figure 10, goes to a control switch 224 which is associated with the relief valve of the hydraulic circuit. This relief valve is normally in the position in which it is shown in Figure 10, and therefore, the switch 224 is normally closed. Since the other line 225 which leads to this switch is a branch of the power main 215, it will be apparent that when the operator depresses the manually operable switch 221, he connects the power main 215 to one end of solenoid 216 and thereby closes the circuit to power main 66, whereby the switch member 226 will be moved to a closed position and connect the three leads from pump motor 203 to the power mains. Since the switch 220 is of the push button type with spring return, it will be apparent that as soon as the operator releases the switch it will reopen the connection between contacts 219 and 221. Therefore, a holding circuit has been provided, including a set of contacts 227 and 228 which are connected in parallel with the contacts 219 and 221 so as to maintain the circuit through the operating solenoid 216.

When pump 203 develops sufficient pressure in the system it will close a hydraulically operated switch 229 and thereby connect line 223, which is now a power line, to line 230, which is connected in parallel to the operating solenoids of the remaining pump switches 206, 207, 208 and 209, thereby causing these switches to close and the connected motors to operate. As an indication to the operator that these circuits have been properly closed, a light 231 is connected across the motor 203, whereby the same will be illuminated when power is properly connected to the motors.

With all of the motors of the machine properly running, the operator pushes a work piece from the incoming conveyor 124 onto the elevator and then depresses the "Autocycle" push button 232. This connects contact 233 which is a terminal of the power line 223 to contact 234 which is connected by line 235 to one starter coil 236 of a reversible control switch 237 for the work transfer motor 142. The other terminal of this coil is connected through line 237, switch 238, line 239, switch 240, line 241, switch 242, line 243, switch 244, line 245, switch 246 to line 247 which is a branch of the power main 214. The switches 238, 240, 242, 244 and 246 are all normally closed when the machine is started. Since the connection between the contacts 233 and 234 will be broken when the push button 232 is released, a holding circuit for coil 236 has been provided and comprises contacts 248 and 249 which will be closed upon closing of switch 237, thereby connecting the end of solenoid 236 directly through branch line 250 to the power line 223. The switch 237 has a pair of power contacts 250 and 251 which are permanently connected to the power mains 66 and 215, and when the solenoid 236 is energized these contacts are electrically connected to contacts 252 and 253 which have lines 254 and 255 extending therefrom to the work transfer motor 142. In addition, a third line 256, which is directly connected to the power main 214, extends to the terminal 257 of the motor 142.

The control switch 237 has a second pair of power contacts 258 and 259 which are connected to power mains 215 and 66 which, it will be noted, is the opposite means to which contacts 251 and 250 are connected, so that upon actuation of the starter solenoid 260 the line 255 will be connected to the power main 66 instead of to the power main 215, and the line 254 will be connected to the power main 215 instead of to the power main 66. Since the motor 142 is a three-phase motor with a constant return line 256, it will be apparent that by reversing the connections to lines 255 and 256 that the motor 142 may be reversed.

Normally, during the operation of the machine, the motor 142 only rotates in one direction and the starter coil 236 starts and stops the motor. As viewed in Figures 4 and 10, the direction of rotation of the motor is such that the worm wheel 147 rotates in a clockwise direction. During one rotation, the worm wheel actuates three switches 261, 262 and 263.

When the elevator is down and the worm gear 147 is rotated in a clockwise direction, as previously mentioned, a lug 264, shown in Figure 4 and carried by the link 148, operates switch 261, but since no effect is produced at this time, a description of the function of this switch will be deferred. Near the completion of rotation of gear 147, the pointed end 265 of line 148 actuates switch 262. From Figure 10, it will be noted that this switch is normally open and that upon actuation thereof the power line 256 is connected to line 266 which is connected through switch 267 of relay 268 to the relay coil 269 of relay 270. The circuit from the other end of this coil is completed through line 271, switch 272 and line 273 to the power line 225, which is a branch of the power main 215. Energization of the relay coil 269 will break switches 240 and 274 and close switches 275 and 276. The opening of switch 274 produces no effect at this time, but the opening of switch 240 would normally break the holding circuit through the relay coil 236 of the control switch for motor 142 but this circuit is still maintained due to a branch connection 277 from line 239, which line extends to contact 278 of switch 263 which is normally closed and which has its other contact connected to the power line 256, which, as previously described, is a branch from the power main 214. Closing of switch 276 of relay 270 establishes a holding circuit for the relay coil 269 after the end of the link 265 releases switch 262. In other words, current from the power main 214 flows through line 247, switch 279 and line 280 to contact 281 which is connected by switch 276 to contact 282, line 283 to contact 284 of switch 285. This switch is normally closed, whereby the current continues to flow through line 286 to line 266, which, as previously described, is connected to the relay coil 269. Closing of switch 275 connects the power line 287, which is a branch of the power main 215, to line 288 which leads to the relay coil 289, the other end of relay coil being connected to the power line 217. Energization of this coil will close switch 76, and thereby, as previously described, energize the solenoid 61 of the pilot valve actuating mechanism of the hydraulic circuit, causing shifting of the pilot valve plunger 52 to the left, which will thereby cause hydraulic shifting of the main control valve 29 into a feeding position whereby the elevator will start its upward movement.

After momentarily closing switch 262, the worm wheel 147 will rotate a little further and cause opening of switch 263, which, as previously described, was acting to maintain the holding circuit of starter coil 36. When switch 263 opens the starter coil 236 it will become de-energized and the switch will open and thereby stop rotation of the transfer motor 142.

A work piece has now been moved into the work holder and the ram has started its upward movement whereby the mechanism shown in Figure 4 for seating and clamping the work will become effective. As shown in Figures 4 and 5, a pair of telltale switches 290 and 291, which switches are closed by the work when the same is properly seated in the fixture, are provided. As shown in Figure 10, these switches are connected in series with one another and in parallel with switch 285 to lines 283 and 266. As the elevator moves up a dog 292 carried by the elevator, as shown in Figure 4, momentarily opens switch 285, which thereby puts the burden on switches 290 and 291 for maintaining the holding circuit of relay 269. Should this circuit not be complete for any reason, the relay coil 269 will become de-energized and the switch 275 would open, thereby, in turn, opening switch 276 which controls the actuation of the pilot valve and the pilot valve would shift to a neutral position and stop the upward movement of the ram.

At the beginning of the upward movement of the ram another dog 293 passes out of engagement with a switch plunger 294, causing the same to shift toward the right, as viewed in Figure 10, and close a circuit from line 295 which runs from switch 296 of relay 297 to line 298 which is, in turn, connected through safety switch 299 to line 300 which terminates in the operating solenoid 301 for the relay 75 which controls shifting of the pilot valve to a position causing downward movement of the ram. Since the switch 296 is open, nothing will happen as a result of the shifting of switch 294, but it will be noted that the circuit is continued so that upon energization of the relay coil 302 downward, movement of the ram may be effected.

The safety switch 299 is held in a closed position by a safety hook 303, which is normally held out of position by a solenoid 304 which is connected by a pair of lines 305 and 306 to switch 307 which has an operating solenoid 308. One end of this solenoid is permanently connected to the power line 217 and the other end is connected to the power line 223 upon closing of the hydraulically actuated switch 229 when the machine was started. In other words, as soon as the pumps of the machine are actuated, and a sufficient pressure has been built up to cause operation of the hydraulic ram or elevator, the safety hook 303 is withdrawn from the path of the elevator, but should there be a failure in the circuit for some unknown reason, or should the elevator be left in its top position when the pumps are shut down, the hook will be in a position to engage a lug on the elevator and prevent the same from dropping and causing damage to the machine. Shifting of switch 294 also disconnected line 295 from line 309 which leads to the operating solenoid 310 of switch 311. This switch controls a pair of lines 312 and 313 which control operation of solenoid 122 of the decelerator valve 110.

During upward movement of the ram, another dog 315 passes out of engagement with a switch 316 which is permitted to close and thereby connect branch power line 317 to line 318 which extends to relay coil 302 of the relay switch 297. The return line 319 from this coil is connected through switch 320 to line 321 which terminates, as shown in Figure 10, in a bus bar 322. The closing of switch 316 conditions the circuit for operation of the relay coil 302 when the elevator has reached the upper end of its stroke. It will be noted from Figure 10 that the electrical circuit in the elevator is connected through a series of sliding contacts with the electrical circuit in the stationary part of the machine and the bus bars of these sliding connections are suitably positioned on the side of the column for engagement by the sliding shoes carried by the elevator. It will be noted that these bars are not continuous but are of sufficient length at the top and bottom to maintain the desired contacts during times when the associated circuits are utilized.

Figure 8:
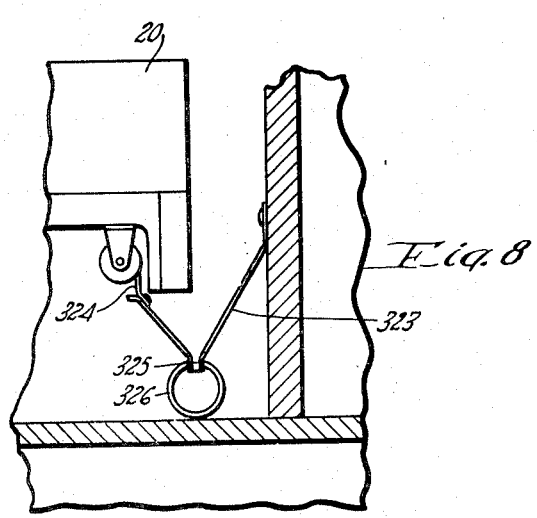
Figure 8 is a detail view showing the chip receiving trough and the connection of the exhaust system thereto.

As the elevator travels upward the work is broached on opposite ends and to a precision length, and as shown in Figure 8, the chips will fall through the spaces between the end of the elevator 20 and the vertical wall of the columns, and means have been provided for collecting and removing these chips in an efficient manner so as not to interfere with the operation of the machine. In other words, a chip receiving hopper 323 has been provided at the bottom of the machine and longitudinally of the face of each column, and to insure that the chips are directed into this hopper a roller curtain 324 is mounted on the underside of the elevator with the end of the curtain attached to one side of the hopper. It will be apparent that as the elevator moves upward a curtain will unroll and provide a narrow vertical passage through which chips will be guided into the trough below. The bottom of the hopper has a narrow longitudinal opening 325 which serves as a connection to an exhaust pipe 326 through which chips are drawn by a suction fan operated by one of the motors 204—205 mounted in the receiver 327 to which the pipe 326 is connected. It will be noted from Figure 1 that there is a receiver mounted adjacent the rear of each column. There has thus been provided automatic suction means for removing chips from the machine. After the broaching operation has been completed, trip dogs, similar to 168 and 152 shown in Figure 4, will positively actuate the plungers 153 and 169 to unclamp and raise the work out of the fixtures, and at the same time another dog will operate the lever 190 and release the toggle operated clamps on the top of the work, permitting the same to be raised out of the fixture. These operations are immediately followed by the tripping of limit switch lever 328 by dog 293, thereby interconnecting line 329 which is connected to the power main 215 by switches 274, 330 and 331 to line 332 which leads to the starter coil 236 of the transfer motor control switch. The other end of this coil is connected, as before, through line 237 to the branch 247 of power main 214, thus completing the circuit and energizing the coil. This will start rotation of the transfer motor. It will be noted that the tripping of the limit switch 328 broke the connection between lines 271 and 273 which thereby opened the holding circuit of relay coil 269 of switch 270, thereby causing the switches 275 and 276 to open and the switches 274 and 240 to close. The opening of switch 275 broke the holding circuit to relay coil 289, thereby opening switch 276 and de-energizing solenoid 61, which thereby permitted the spring 62 to centralize the pilot valve plunger 52 and shift the main control valve 37 to a central position which thereby stopped the upward movement of the elevator. It will now be seen that the elevator has stopped and the transfer mechanism has started the execution of another cycle, which will eventually remove the work from the position indicated by the reference numeral 139 in Figure 3 to the position indicated by the reference numeral 141.

During the first half of the clockwise movement of worm wheel 147, the work is moved, and during the other half of a revolution the work pushers are being returned. In order to insure that the work has been removed from the work holding fixture and out of the path of the broaching tools, a safety switch 333 has been provided on the work elevator, and in such a position that the same will be closed when the work reaches the position indicated by the reference numeral 141 in Figure 3. During the last half revolution of the worm wheel 147 the lug 264 will momentarily close the switch 261, which is connected in parallel with the switch 333. With both of these switches closed, a circuit is completed from line 256, which is a power line, to line 334, which at this time terminates in a shoe 335 riding on the bus bar 322. The line 321, connected to this bus bar, goes to relay coil 302 which thereby operates the relay switch 297, the return circuit being completed through line 318, switch 316 and line 317 to the power line 225.

When the relay switch 297 is operated it will open switches 330 and 242 and close switches 296 and 336. The closing of switch 336 establishes a holding circuit for relay coil 302 by connecting the power line 280 to the line 337, which is a branch of line 321 leading to the coil. Therefore, when the ram moves downward, and the shoe 335 passes out of contact with the bus bar 322, the relay coil 302 will still remain energized.

Closing of switch 296 will connect the power line 338 to line 295 whereby the current will flow through the switch 294, line 298, safety switch 299 and line 300 to energize the relay coil 301 and close switch 75. This will energize the solenoid 60 and shift the pilot valve to its rapid traverse down position, whereby the ram will start its downward movement.

The opening of switches 330 and 242 of the relay switch 297 disconnected lines 329 and 239 from power mains 215 and 247 and since these lines lead to opposite ends of the starting coil of the transfer motor switch 237, it would ordinarily open, but a holding circuit is still maintained through the normally closed limit switch associated with the worm wheel 147.

In other words, this circuit is now complete through line 237 connected to one end of coil 236, switch 238, line 277 to contact 278 of the limit switch which is connected to contact 263 of power line 256. The other end of the coil is connected through closed contacts 248 and 249 to line 250 which is a branch of the power line 223.

Continued rotation of the worm wheel 147 will momentarily close the toggle switch 262, but this will be without effect because of breaks in the circuit to the relay coil 269, and the worm wheel will continue to rotate until it opens the next toggle switch which will break the connection between contacts 263 and 278 and thereby de-energize the starting coil 236 of the transfer motor control switch 237, thereby stopping rotation of the transfer motor.

During downward movement of the elevator, the dog 293 passes out of engagement with the switch 328, permitting the same to be spring returned to the position shown in Figure 10, opening one set of contacts and closing the other without effect. Near the end of the downward stroke, the dog 293 operates the toggle switch 294, thereby opening the circuit between lines 295 and 298 which will thereby de-energize the relay coil 301 of the pilot valve controlled switch, whereby switch 75 will open and solenoid 60 will be de-energized. This will permit the springs 62 to centralize the pilot valve and thereby shift the main control valve 37 to a stop position. At the same time the switch 294 will close the circuit between lines 295 and 309, energizing the relay coil 310 and closing the circuit to lines 312 and 313 which will thereby, through solenoid 122, shift the decelerator valve into an operative position, which will stop the downward movement of the ram without shock. In addition, a dog 315 will open toggle switch 316 which will thereby break the holding circuit to relay coil 302, opening switches 336 and 296 and closing switches 330 and 242. This will break the power connection of line 338 to switch coil 310 and thereby break the circuit to the decelerator valve operating solenoid 122 whereby the decelerator valve will return to its normal position and thereby condition the hydraulic circuit for the next upward movement of the elevator.

In addition to automatic control of the cycle of operation of a machine as just described, the circuit provides manually operable switches for interrupting the cycle of the transfer mechanism and a manually operable control for governing actuation of the elevator.

Referring to Figure 9, a push button switch 339 is provided which, when depressed, interconnects contacts 340 and 341 whereby the power line 223 is connected to the operating solenoid 342 which, when energized, opens switch 246 and closes a switch 343. If the switch 339 is closed during the operation of the transfer motor, which means that the relay coil 236 of the transfer motor switch is energized, the opening of switch 246 which is in the holding circuit for the solenoid 236 will deenergize the relay coil 236, thereby opening the circuit to the transfer motor. This will cause the transfer motor to stop. But simultaneously the switch 343 will be closed by solenoid 342, thereby closing the circuit to the transfer motor relay coil 260, thereby closing the reversing switch to the transfer motor, whereby the same will reverse without completing its cycle. This switch serves the emergency, where, for any reason, the work piece should get caught while being transferred by the transfer mechanism.

If the work is manually positioned on the movable rails in proper cutting position and it is desired to execute an automatic cycle without the transfer mechanism first executing its cycle of operation, another push button switch 344 is provided which, when depressed, will connect the power line 214 to line 266, causing energization of relay coil 269, thereby closing switch 275 which will operate relay coil 289 and close the switch to the pilot valve solenoid 61.

For simply causing up and down movement of the hydraulic elevator, as for set-up purposes, a separate manual control lever 345 is provided which is connected to a pair of switches 346 and 347. When the lever is thrown upward, switch 346 connects the power line 214 to line 348 which energizes relay coil 269; and switch 347 connects power line 214 to line 349 and thereby energizes relay coil 268, which opens all the other circuits and prevents actuation of the transfer motor. As soon as the manual control 345 is thrown back to its central position, the movement of the ram will stop. When the manual control lever is thrown downward, the switch 346 will connect the power line 214 to line 350 which will thereby energize coil 302 which will thereby close switch 296, which, in turn, will energize relay coil 301 and close switch 75 to a pilot valve operating solenoid 60.

In addition, switch 347 will connect power line 214 to line 349 and energize relay coil 268, which will open the circuits to the other lines and prevent operation of the transfer mechanism.

The condition may occur in which the machine is stopped with the ram at the upper end of its stroke and the work piece in the position on the transfer table indicated by the reference numeral 141 in Figure 3, whereupon if the machine was again started by depressing the auto-cycle push button 232 the transfer mechanism would execute another cycle before the ram started downward, in which case the work would be pushed off of the end of the transfer table and thereby drop and cause considerable damage and possible injury.

To avert such a possibility, the transfer table has been provided with an additional switch 351, which, as shown in Figure 10, has one contact connected to the power line 256 and the other contact connected to line 352 which terminates in a shoe 353. When the elevator is at the upper end of the stroke, this shoe rides on the cross bar 354, thus completing the connections through line 355 to operating solenoid 356 of switch 238. When the circuit is completed by the work closing the switch 351, the switch 238 will be opened and thereby prevent energization of either of the relays 236 or 260 which control the starting of the transfer motor 142. Thus, the presence of the work on the end of the transfer closes one circuit which permits the ram to be moved downward and closes another circuit which prevents a second cycle of operation of the transfer mechanism while the ram is in its extreme upward position.

There has thus been provided an improved broaching machine which will broach large work pieces to precision length and which has a complete automatic cycle of operation, and in which the improved control mechanism has a number of safety interlocks rendering the machine safe for operation in the hands of a novice.

What is claimed is:

1. The combination with a shiftable work holder for a broaching machine, and means located centrally of said work holder for securing a work piece therein, of a transfer mechanism supported by said work holder including reciprocable means having a first set of fingers for moving work from one end of said work holder to the central position thereof; a second set of fingers for moving work from said central position to the other side thereof; and a third set of fingers for moving work from the last-named position off of said work holder.

2. In a broaching machine, the combination with a ram movable relative to a broaching means, of a work holder carried by the ram, fixed guide rails carried by the ram and located on opposite sides of the work holder upon which work may be conveyed into and out of the work holder, movable guide rails interposed between the ends of said fixed guide rails and movable perpendicular to the plane thereof for lowering a work piece into the work holder, and trip means operable upon movement of the ram for causing said movable rails to be lowered.

3. In a broaching machine having a movable support and power operable means for moving said support relative to a broaching means, of a work holder carried by said support including work supporting means movable from a first position in which it receives a work piece to a second position in which the work is to be clamped, a plurality of means for clamping the work, and trip means operable upon power movement of said movable support to cause actuation of said work clamping means.

4. In a broaching machine having a support movable relative to a broaching means, the combination of a one revolution mechanism carried by the movable support for moving work thereon into a machining position, power operable means for moving the support, and an electrically operable mechanism for automatically stopping said one revolution mechanism and initiating movement of said support by said power operable means.

5. In a broaching machine having a support movable relative to a broaching means, the combination of a one revolution mechanism carried by the movable support for moving work thereon into a machining position, power operable means for moving the support, and electrically operable mechanism for automatically stopping said one revolution mechanism and initiating movement of said support by said power operable means, said mechanism also including telltale switches effective to stop movement of the support if the work is not properly positioned in the work holder.

6. In a broaching machine having opposed broaches and a support movable between said broaches, the combination of a work holder located on said support in alignment with said broaches, a power operable mechanism carried by the support for moving work therealong into said work holder, power operable means for moving said support, an electrical control mechanism including a manually operable switch for initiating an automatic cycle including sequential actuation of said mechanism and said power operable means, and an additional control for interrupting said cycle and causing reverse actuation of said mechanism.

7. In a broaching machine having a ram movable relative to a broaching means, the combination of a hydraulic control circuit for said ram including a pilot valve shiftable to a position for starting movement of the ram, a work holder carried by the ram, power operable mechanism associated with the work holder for transferring work to the holder, and means operable by the mechanism upon completion of movement of the work into said holder for causing shifting of said pilot valve to a starting position.

8. In a broaching machine having a ram movable relative to a broaching means, the combination of a hydraulic control circuit for said ram, including a pilot valve shiftable to a position for starting movement of the ram, a work holder carried by the ram, power operable mechanism associated with the work holder for transferring work into the holder, means operable by the mechanism upon completion of movement of the work into said holder for causing shifting of said pilot valve to a starting position, and means operable by the ram for shifting said pilot valve to a stop position, thereby terminating movement of the ram.

9. In a broaching machine having broaching tools, and a ram for moving work relative to said tools, the combination of power operable means for moving the rams including a stop mechanism, a work holder carried by the ram, power operable means associated with said work holder for automatically removing work therefrom, and means trip operable by the moving ram for actuating said stop mechanism and initiating operation of said transferring mechanism.

10. In a broaching machine having a ram movable in one direction relative to a broaching means on the cutting stroke and in the opposite direction of a non-cutting stroke, the combination of a work transfer mechanism carried by said ram for moving work at the end of a cutting stroke into a position on said ram out of alignment with said broaches whereby the ram may be returned to a starting position without interference, power operable means for actuating said transfer mechanism, means operable by said mechanism for initiating return movement of the ram, and an interlock responsive to work position to interrupt said return movement if the work is not properly removed out of alignment with said broaches.

11. In a broaching machine having a broaching tool supported in a vertical place, a hydraulically movable ram for moving a work piece past said broaching tool upon an upward cutting stroke and a downward non-cutting stroke, a control valve having a first position for causing upward movement of the ram, a second position for causing downward movement of the ram, and a third position for stopping said ram; and a deceleration valve operable by the ram for interconnecting both ends of the cylinder when said first-named valve is shifted to a stop position for retarding movement of the ram.

12. In a broaching machine having a vertical column, a broaching tool mounted on said column and a work carrying elevator for feeding work past said broaching means, of a V-shaped trough located beneath said broaching means and said elevator for receiving falling chips, one leg of said trough being secured to said column, a roller curtain supported on the underside of said elevator, the end of said curtain being attached to the other leg of said trough whereby during upward movement of the elevator falling chips will be directed to said trough, and suction means for withdrawing chips from the bottom of said trough.

13. In a machine tool having a work carrying member movable relative to a metal working tool, of a work transferring mechanism carried by said member for moving work therealong into alignment with the tool, a prime mover for said mechanism, a power operable member for traversing the work carrying member, a manually operable control for starting said prime mover, means operable by said mechanism for stopping said prime mover and energizing said power operable member, and means responsive to movement of said work carrying member for clamping the work as it approaches the metal cutting tool.

14. In a machine tool having a work carrying member movable relative to a metal working tool, of a work transferring mechanism carried by said member for moving work into alignment with the tool, a prime mover for said work transferring mechanism, a power operable member for actuating the work holding member, a manually operable control for starting said prime mover, means operable by said transferring mechanism for stopping said prime mover and energizing said power operable member, means responsive to movement of said work carrying member for clamping the work as it approaches the metal cutting tools, and means operable by the work carrying member after the work has passed the tool to release said clamping means.

15. In a broaching machine, a pair of broaching tools arranged in vertical planes and in opposed relation to one another, an elevator movable between said broaches, power operable means carried by the elevator for moving work onto said elevator in alignment with said broaches, power operable means for moving said elevator and the work carried thereby past said broaches, and means trip operable by the elevator after passing said broaches to cause said first-named means to move the work out of alignment with said broaches whereby the elevator may be returned without interference between the work and broaches.

16. In a broaching machine, a pair of broaching tools arranged in vertical planes and in opposed relation to one another, an elevator movable between said broaches, power operable means carried by the elevator for moving work in alignment with said broaches, power operable means for moving said elevator and the work carried thereby past said broaches, means trip operable by the elevator after passing said broaches to cause said first-named means to move the work out of alignment with said broaches whereby the elevator may be returned without interference between the work and broaches, and means responsive to outboard positioning of the work to automatically cause downward movement of said elevator.

17. In a broaching machine having a pair of broaches supported in vertical planes and in opposed operating relation, of a work support movable between said broaches for causing a work piece carried thereby to be machined to a predetermined length, automatically operable means effective at the end of the stroke for moving the work piece along a path at right angles to the direction of said cutting stroke, means responsive to work removal for causing return movement of said work support at a rapid rate, and trip operable means effective near the end of said return stroke for rapidly decelerating the work support and bringing the same to a stop.

18. In a broaching machine having a pair of vertically positioned broaches arranged in opposition to one another, and a work holder vertically reciprocable between said broaches, of a first means carried by the work holder for transferring work from an outside source into a position in alignment with said broaches, and a second means carried by the work holder for transferring the machined work to a third position out of alignment with said broaches at the completion of a broaching movement of the holder whereby the work holder may be returned to a starting position without interference between the work and broaches, and a third power operable means carried by said work holder for ejecting the finished work from the machine.

19. In a machine tool having a metal working tool and a work support, the combination with power operable means for effecting relative movement between the work support and tool, of power operable means carried by the work holder for transferring work therealong out of alignment with said metal working tool after the machining operation, means responsive to removal of the work for reversing said power operable means, and an interlock effective to prevent actuation of said power operable means if the work has not been completely removed.

20. In a broaching machine having a pair of vertical columns, broaching tools supported on the opposing faces of said columns, a work holder movable between said columns for feeding work past said broaching tools, a receiving conveyor and a delivery conveyor arranged on opposite sides of said columns, a first power operable means for moving work from said receiving conveyor into a position between said columns, a second power operable means for moving said work at an angle to its path of introduction past said broaches, a third power operable means for removing work from between said columns at the end of a feeding stroke, means for reversely shifting the work with respect to the broaches, and additional power operable means for ejecting work to said delivery conveyor upon completion of said reverse movement.

21. In a broaching machine having a pair of columns, opposed faces formed on said columns making an acute angle with a desired cutting plane, broaching tool assembly blocks having a series of broaching tools mounted in each block and adapted to be arranged in parallel relation to said cutting plane, said blocks having a supporting wall, the plane of which makes an acute angle to the plane of said broaching tools equal to the first-named acute angle whereby upon assembly of the blocks with said acute angle surfaces on the columns the broaching tools will be aligned parallel to said desired cutting plane.

22. In a broaching machine having a pair of columns, opposed faces formed on said columns making an acute angle with a desired cutting plane, broaching tool assembly blocks having a series of broaching tools mounted in each block and adapted to be arranged in parallel relation to said cutting plane, said blocks having a supporting wall, the plane of which makes an acute angle to the plane of said broaching tools equal to the first-named acute angle whereby upon assembly of the blocks with said acute angle surfaces on the columns the broaching tools will be aligned parallel to said desired cutting plane, and means to determine the lateral position of said blocks on the acute angle surfaces of the column and thereby determine the depth of cut to be taken by said broaching tools.

23. In a broaching machine having a pair of vertical columns, depressions formed in the opposing faces of said columns, said depressions having parallel side walls and an enclosing wall making an acute angle with one of said side walls, a plurality of blocks, each having a series of broaching tools mounted therein for mounting in said depressions, said blocks having a supporting wall making an acute angle with the plane of said broaching tools, adjustable means carried by said blocks and engageable with said parallel side walls of the depressions for laterally positioning the blocks therein, and means to clamp the blocks in said depressions.

24. In a broaching machine having a pair of surface broaches supported in opposite relation to one another, the combination with a work holder movable between said broaches for finishing of a work piece carried thereby to precision length, means for shifting the work holder to effect a broaching operation, unidirectionally effective work transferring means carried by and movable with and relative to the work holder for moving the work from one side of said broaches into broaching position with respect to the work holder and for ejecting work from the work holder at the opposite side of said broaches, and means for imparting successive unidirectionally effective movements to said work transferring means.

MILLARD ROMAINE.
WINTHROP TRIBLE.